United States Patent
Stangl (10) Patent No.: US 11,434,018 B1
(45) Date of Patent: Sep. 6, 2022

(54) SWITCHABLE AIR INLET DEVICE FOR ENGINE AIR

(71) Applicant: Airbus Defence and Space GmbH, Taufkirchen (DE)

(72) Inventor: Wolfgang Stangl, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 17/535,997

(22) Filed: Nov. 27, 2021

(51) Int. Cl.
*F01D 1/02* (2006.01)
*B64D 33/02* (2006.01)
*F02C 7/04* (2006.01)

(52) U.S. Cl.
CPC ............ *B64D 33/02* (2013.01); *F02C 7/04* (2013.01)

(58) Field of Classification Search
CPC ... B64D 33/02; F02C 7/04; F02C 1/00; F02C 1/105; F02C 7/00; F02C 7/055; F02C 7/24; F02C 7/057; F04D 29/4213; F04D 29/526; F01D 1/34; F01D 9/02; F02B 1/04
USPC ........................................................ 415/183
See application file for complete search history.

(56) References Cited

U.S. PATENT DOCUMENTS

| | | | | |
|---|---|---|---|---|
| 4,007,587 A * | 2/1977 | Banthin | ................. | B64D 33/04 60/770 |
| 4,095,417 A * | 6/1978 | Banthin | ................. | F02K 1/825 239/265.17 |
| 4,136,518 A * | 1/1979 | Hurley | ..................... | F02K 1/825 60/264 |
| 5,404,713 A * | 4/1995 | Johnson | ................. | F02K 1/825 60/226.3 |
| 5,746,047 A * | 5/1998 | Steyer | ..................... | F02K 1/825 239/265.17 |
| 5,894,722 A * | 4/1999 | Chevalier | ................. | F02K 7/10 60/768 |
| 6,055,804 A * | 5/2000 | Hammond | ............. | F02K 1/825 239/265.17 |
| 6,122,907 A * | 9/2000 | Frawley | .................. | F02K 1/825 239/265.17 |
| 6,253,540 B1 * | 7/2001 | Chew | ..................... | F02K 1/825 239/265.17 |
| 7,284,364 B2 * | 10/2007 | Means | ................. | F01N 13/082 60/264 |

(Continued)

FOREIGN PATENT DOCUMENTS

| | | | | |
|---|---|---|---|---|
| GB | 2 509 886 A | | 7/2014 | |
| GB | 2509886 A | * | 7/2014 | ............. F02C 7/052 |

OTHER PUBLICATIONS

Extended Search Report for U.S. Appl. No. 21/207,683 dated Apr. 5, 2022.

*Primary Examiner* — Hung Q Nguyen
*Assistant Examiner* — Anthony Donald Taylor, Jr.
(74) *Attorney, Agent, or Firm* — Jenkins, Wilson, Taylor & Hunt, P.A.

(57) ABSTRACT

An air inlet device for an air inlet of an aircraft. The air inlet device has air guide arrangements. An air guide arrangement has an inlet plate, an outlet plate, and pivot plates arranged therebetween. The outlet plate and the pivot plates can be rotated about a central axis of the air inlet device by adjustment rings, so that the air guide arrangement is transitioned from a linear state to a curved state, and vice versa. The air inlet device allows for selective switching between a state with low radar signature and a state with high performance of an engine.

10 Claims, 5 Drawing Sheets

(56) References Cited

U.S. PATENT DOCUMENTS

| | | | | |
|---|---|---|---|---|
| 7,900,460 | B2 * | 3/2011 | Harefors | F02K 1/006 60/770 |
| 8,322,126 | B2 * | 12/2012 | Bies | F01D 25/30 60/770 |
| 8,341,934 | B2 * | 1/2013 | Chapkovich, III | F02K 1/825 60/262 |
| 8,776,527 | B1 * | 7/2014 | Sokhey | F02K 1/825 60/770 |
| 2006/0254271 | A1 * | 11/2006 | Imanari | F02K 3/06 60/598 |
| 2007/0028623 | A1 * | 2/2007 | Steyer | F02K 1/386 60/39.5 |
| 2010/0146980 | A1 * | 6/2010 | Strom | F02K 1/825 60/770 |
| 2013/0048780 | A1 * | 2/2013 | Masoudipour | F02C 7/32 244/58 |
| 2016/0159456 | A1 * | 6/2016 | Haslach | B64C 13/24 244/219 |
| 2018/0023411 | A1 * | 1/2018 | Froemming | F02K 1/825 415/148 |
| 2022/0042518 | A1 * | 2/2022 | Dumas | F02C 3/04 |

* cited by examiner

SWITCHABLE AIR INLET DEVICE FOR ENGINE AIR

TECHNICAL FIELD

The description relates to an air inlet device for use in an air inlet for an engine, as can be used advantageously in jet aircraft and in particular supersonic aircraft such as military combat aircraft.

BACKGROUND

Engines, such as jet engines, are supplied with air and a fuel to generate therefrom propulsion energy for an aircraft. The air is taken from the environment of the aircraft and is supplied to the engine through an inlet opening.

For high performance or a high propulsive power of the engine, it is advantageous if the inlet flow, i.e. the air drawn into the inlet opening, has a high energy. For this purpose, it is generally advisable that the air drawn into the inlet opening is guided in a straight line towards the engine. However, such an architecture can have the disadvantage that the engine itself and components belonging to the engine are "visible" to radar systems through the inlet opening of the engine air, i.e. that the engine has a significant radar signature and is thus detrimental to the radar signature of the aircraft.

In order to reduce the radar signature and thereby improve stealth against radar reconnaissance, the air inlet (i.e. the air duct extending from the inlet opening to the engine and carrying air from the environment to the engine) can have a curved course so that the engine is not visible in a straight line through the air inlet. Such a curved course of the air inlet improves the radar signature of the aircraft but may adversely affect the performance of the engine because the curved course has adverse effects on the airflow in the air inlet.

Another way to reduce the radar signature of the engine is, for example, to use a coating for the inner surface in the air inlet, which coating at least absorbs electromagnetic waves in the wavelength range of a radar system. The disadvantage of such a coating is the high weight and the high maintenance effort, because the coating has to be refreshed regularly as it is gradually worn away by the high speed of the inflowing air.

SUMMARY

It can be considered an object of the disclosure herein to design an air inlet for an engine in such a way that the radar signature of an aircraft is low and the performance of the engine is as high as possible.

This object is achieved with the subject matter disclosed herein. Refinements result from the following description.

According to one aspect, an air inlet device for an air inlet duct to an engine of an aircraft is disclosed. The air inlet device has a frame, a center tube extending in an airflow direction, and a plurality of air guide arrangements extending between the frame and the center tube. An air guide arrangement has an inlet plate, a first pivot plate, a second pivot plate, a third pivot plate, and an outlet plate. The inlet plate and the first pivot plate are pivotably connected to each other via a first pivot axis. The first pivot plate and the second pivot plate are pivotably connected to each other via a second pivot axis. The second pivot plate and the third pivot plate are pivotably connected to each other via a third pivot axis. The third pivot plate and the outlet plate are pivotably connected to each other via a fourth pivot axis. The first pivot axis, the second pivot axis, the third pivot axis, and the fourth pivot axis extend so that they intersect at a common intersection point located on a central axis of the air inlet device.

The air inlet device is particularly suitable for use in a jet aircraft. Such an air inlet device can be used to be arranged in an air duct or air inlet between an inlet opening in the outer wall of the aircraft and the engine or a compressor stage of the engine. The air inlet is designed to receive air from the environment and to supply it to an engine, in particular a jet engine, and in combination with a fuel or propellant to generate propulsion energy for the aircraft. The air is guided from the air inlet to the engine via suitable mechanisms which are known in principle.

The air inlet device allows for switching between two states: a state with a linear course of the air guide arrangements and a state with a curved course of the air guide arrangements. In the state with a linear course of the air guide arrangements, the performance of the engine is greater, but the radar signature of the aircraft is also higher because the engine, especially its first compressor stage, has a high radar signature. In the state with a curved course of the air guide arrangements, the radar signature is significantly reduced, but the performance of the engine may be reduced due to the deflection of the air. Depending on the requirements of the aircraft's mission profile, one or the other state of the air inlet arrangement can be selected. In other words, the air inlet device allows for selective switching between a state with low radar signature and a state with high engine performance.

The pivot axes intersect in both states at the common intersection point, i.e. in both the linear and in the curved state of the air guide arrangements and in any state between these two states when the air guide arrangements are rotated from the state with a linear course to the state with a curved course (or vice versa).

Preferably, the frame is cylindrical and the air guide arrangements extend in the radial direction of the frame between the frame and the center tube, wherein the inlet plate, the pivot plates and the outlet plate do not contact the center tube and are slightly spaced therefrom, for example by a few tenths of a millimeter to a few millimeters.

The plates of the air guide arrangement are arranged sequentially one behind the other in the direction of flow in the order mentioned. Inflowing air first hits the inlet plate and then flows past the first, second, third pivot plate and finally the outlet plate.

The pivot plates can perform a pivotal movement about the irrespective connected pivot axes and thus deflect the airflow, because the angular position of the pivot plates in relation to the airflow direction can be changed by the pivotal movement. However, the inlet plate and the outlet plate do not change their angular position with respect to the airflow. Preferably, the inlet plate and the outlet plate extend in the airflow direction.

Preferably, all air guide arrangements of the plurality of air guide arrangements are structurally and functionally identical or at least similar in design.

Each pivot axis represents a joint between the connected elements and allows the connected elements to adopt a variable angle with respect to each other. For example, the joint can be in the form of a hinge and has a pin or shaft that pivotably connects the various connected elements.

The structure described here allows the outlet plate to be rotated in the circumferential direction of the frame with respect to the inlet plate to such an extent that the air guide arrangement has a double curvature. The outlet plate can be rotated in the circumferential direction to the extent that a straight line of sight between adjacent air guide arrangements is occluded or interrupted when the outlet plate is rotated to behind the inlet plate of the adjacent air guide arrangement. Thus, a direct line of sight to an engine behind the air guide arrangement is occluded and the radar signature of the aircraft is reduced.

The air inlet device is switchable between two states. In one state, the air guide arrangements have a curved course. Likewise, in this state, the gaps between adjacent air guide arrangements have a curved course, i.e. the direct view through the air inlet to the engine is blocked and the aircraft has a low radar signature. However, due to the curved course of the air guide arrangements, the performance of the engine may be slightly lower. In the other state, the air guide arrangements have a linear course. Likewise, the gaps between adjacent air guide arrangements have a linear course, i.e. the direct view of the engine is unobstructed. In this state, air flows almost unimpeded and in a straight line towards the engine, the engine performance is greater than in the case of the curved course of the air guide arrangements, however, the radar signature is also higher in this state than in the state with the curved course of the air guide arrangements. This switching process is made possible by the structure of the air guide arrangements from the individual plates as well as the orientation of the pivot axes.

The air inlet device described herein enables for switching between the states during the operational time (in-flight or during the mission) of an aircraft, for example when conditions require switching (high engine performance required as compared to low radar signature required).

An air guide arrangement can also be constructed of more than three pivot plates arranged between the inlet plate and the outlet plate. In order to enable a longitudinally uniform curvature course on the inlet side and on the outlet side of the air inlet device, an odd number of pivot plates is used, wherein the first and the last pivot plate (numbering based on the order in the airflow direction) are mirror-symmetrical, the second and the penultimate pivot plate are also mirror-symmetrical, the third and the third-to-last pivot plate are also mirror-symmetrical, and so on. By using an odd number of pivot plates, it is possible for the air guide arrangement to be doubly curved, i.e. to first perform a right-hand curvature, which then changes to a left-hand curvature at a turning point, or vice versa. The air flows straight at the air inlet device and thus also passes between the inlet plates of adjacent air guide arrangements, then the air is deflected by the pivot plates, and the outlet plates of adjacent air guide arrangements again guide the air in a straight line out of the air inlet device and towards the engine.

According to one embodiment, the frame and the center tube have a circular cross-section.

This design favors the aforementioned switching process between the two states of the air guide arrangement. In particular, the center tube has a diameter which is small relative to the length of the center tube (for example, less than one third of the length or even less than 10% of the length). By this design, there was a region of direct line-of-sight to the engine regardless of the state of the air guide arrangements, but the region of direct line-of-sight has a very small aperture angle and the influence on the radar signature is thus small.

According to a further embodiment, the first pivot plate, the second pivot plate and the third pivot plate have a variable extension in the airflow direction.

Preferably, the inlet plates of the air guide arrangements remain in the same position in all states and maintain their orientation. Preferably, the outlet plates are only moved in the circumferential direction of the frame, but do not move in the airflow direction and also do not change their orientation. In order to then achieve a curved course of the surface of the air guiding arrangement, the pivot plates have a variable length.

In principle, it is conceivable that the pivot plates are made of an elastically deformable material so that their length can adapt to the position of the pivot axes. However, the pivot plates are usually made of a metallic material which is hardly deformable in the elastic range.

However, to enable a change in length, the pivot plates can, for example, consist of two elements and can be constructed according to the telescope principle. One element can be pushed into a cavity of the other element to accomplish the length change of the pivot plate. The pivot plates can be constructed in such a way that a relative displacement of the elements of the plates with respect to each other differs depending on the distance from the center tube. In particular, the curvature of the air guide arrangement is more pronounced with increasing distance from the center tube than with a smaller distance from the center tube. The greater the distance from the center tube, the more pronounced is the movement of the two elements relative to each other.

According to a further embodiment, the air inlet device further has a plurality of adjustment rings. A first adjustment ring is connected to the first pivot plate and the second pivot plate at the second pivot axis. A second adjustment ring is connected to the second pivot plate and the third pivot plate at the third pivot axis. A third adjustment ring is connected to the third pivot plate and the outlet plate at the fourth pivot axis.

By the adjustment rings, the shape of the air guide arrangement can be varied by rotating the adjustment rings about the central axis of the frame and entraining the pivot plates and the outlet plate, with this movement.

No adjustment ring is arranged on the first pivot axis between the inlet plate and the first pivot axis because the first pivot axis is not moved in the circumferential direction about the central axis. The inlet plate does not change its position or its orientation. The first pivot plate changes its angular position with respect to the inlet plate when the second pivot axis is moved in the circumferential direction.

The air inlet device can have a plurality of air guide arrangements in the form of radially extending air baffles. These air guide arrangements extend from the center tube to the frame. The frame has the adjustment rings. All of the air guide arrangements are attached to the adjustment rings as indicated so that all of the pivot plates of all of the air guide arrangements are entrained when the adjustment rings are rotated about the central axis.

According to a further embodiment, each adjustment ring is connected to the connected pivot plates in such a way that the pivot plates perform a rotational or pivotal movement relative to the adjustment ring when the adjustment ring is rotated about the central axis of the frame.

An adjustment ring forms part of the shell of the frame and the central axis of the air inlet device also forms the central axis or a center point of the adjustment ring and runs perpendicular to the plane of rotation of the adjustment ring. When the adjustment ring is rotated about the central axis, it entrains the pivot plates and the outlet plate, wherein different pivot plates are entrained by different adjustment rings to different extents in the circumferential direction, so that these movements of the adjustment rings bring about a curved course of the air guide arrangements.

According to another embodiment, the plurality of adjustment rings forms a portion of the frame and the adjustment rings are arranged one behind the other in the airflow direction.

According to a further embodiment, the air inlet device further has an actuator connected to each of the plurality of adjustment rings such that a movement of the actuator is transmitted to the adjustment rings to rotate the adjustment rings about the central axis.

The actuator can also have the function of holding the adjustment rings in an assumed state so that the airflow does not unintentionally push the air guide arrangements back into the linear state.

According to a further embodiment, the actuator is connected to each adjustment ring via a gearing, and the actuator is connected to each adjustment ring via a different gear ratio.

The actuator is, for example, an electric motor, an electrohydraulic drive or another source of mechanical energy that is provided as movement. For example, a rotational movement is provided via a drive shaft. Various gear wheels are arranged on the drive shaft and are connected to one adjustment ring each, so that a rotation of the gear wheel is transmitted to the adjustment ring. For example, a toothed rack is arranged on an outer surface of the adjustment ring. When the actuator rotates the drive shaft, and thus the gear wheel, this rotational movement is transmitted to the toothed rack and the adjustment ring rotates accordingly about the central axis, entraining the pivot plates or the outlet plate to move the air guide arrangement from one state to another. Depending on the direction of rotation, the air guide arrangements are moved from the state with a linear course of the air guide arrangements to the state with a curved course of the air guide arrangements, or vice versa.

In principle, it is also conceivable that the air guide arrangements are brought into an intermediate state and remain in this intermediate state for a predetermined period of time. Here, the intermediate state is a state of the air conduction arrangements in which the air guide arrangements are between the state with a linear course and the state with a maximally curved course.

The transmission ratio between the drive shaft and the adjustment ring can be varied, for example by using a gearing with a different gear ratio. The different gear ratio is used because the successively arranged pivot plates must be rotated by increasing amounts of deflection about the central axis so that the air guide arrangement takes on a curved course.

According to a further embodiment, the inlet plate and the outlet plate are always oriented in the airflow direction regardless of a rotational position of the adjustment rings.

Thus, the air can flow in a straight line against each air guide arrangement and is guided in a straight line on the outlet side by the outlet plates towards the engine or a first compressor stage of the engine.

The inlet plate does not change its position or its orientation when the adjustment rings are rotated. The outlet plate, on the other hand, is entrained in the circumferential direction by the adjustment ring connected to it but retains its orientation with respect to the airflow or airflow direction. In other words, both the inlet plate and the outlet plate run along the central axis of the frame. Unlike the inlet plate and the outlet plate, the pivot plates at least change their orientation with respect to the airflow direction. The first pivot plate is rotatably connected with its leading edge to the inlet plate. When the adjustment rings rotate, the first pivot plate only performs a pivotal movement with respect to the inlet plate. However, the trailing edge of the first pivot plate is entrained in the circumferential direction about the central axis by the first adjustment ring when the first adjustment ring is rotated. This movement causes the leading edge of the second pivot plate to also be entrained in the circumferential direction. In order to achieve the curved course of the air guide arrangement, the trailing edge of the second pivot plate is guided by the second adjustment ring even further in the circumferential direction than the leading edge of the second pivot plate. The second pivot plate thus changes its position and orientation when the adjustment rings rotate. The trailing edge of the second pivot plate and the leading edge of the third pivot plate are connected to each other and to the second adjustment ring at the third pivot axis. The second adjustment ring thus moves both the trailing edge of the second pivot plate and the leading edge of the third pivot plate. The third pivot plate and the outlet plate are connected to each other and to the third adjustment ring at the fourth pivot axis. When the third adjustment ring is moved, it entrains the third pivot plate and the outlet plate. The third adjustment ring moves the trailing edge of the third pivot plate in the circumferential direction further than the leading edge of the third pivot plate was moved by the second adjustment ring. Thus, the third adjustment ring changes both its position and its orientation. The third adjustment ring guides the outlet plate as it rotates so that the outlet plate maintains its orientation. In other words, the outlet plate is not rotatably movable with respect to the third adjustment ring and is entrained with the third adjustment ring as this rotates.

Here, the design of an air inlet device with three pivot plates and three adjustment rings has been described as an example. Other embodiments are possible, with more than three pivot plates and a correspondingly adapted number of adjustment rings.

According to a further embodiment, the frame has a cross-sectional widening in front of the air guide arrangements in the airflow direction and has a cross-sectional constriction after the air guide arrangements in the airflow direction.

The cross-sectional widening enlarges the cross-section of the air inlet device by the amount by which the air guide device reduces the cross-section. Thus, an effective flow cross-section available for the engine air remains substantially the same along the air inlet from the inlet opening to the engine. The cross-sectional widening and the cross-sectional constriction can, for example, be designed as conical regions in which the diameter or the cross-section changes in the airflow direction.

BRIEF DESCRIPTION OF THE DRAWINGS

Further details are described with reference to the figures. The figures are schematic and not to scale.

DETAILED DESCRIPTION

Figure 1:
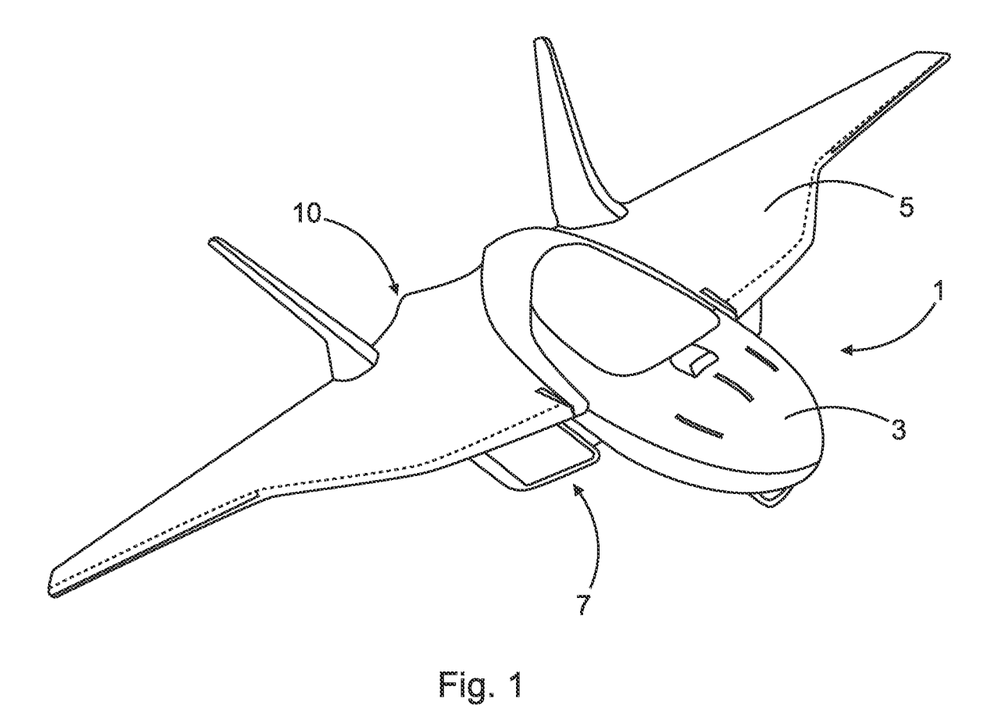
FIG. 1 shows a schematic representation of an aircraft.

FIG. 1 shows an aircraft 1. The aircraft 1 has a fuselage 3 with wings 5 arranged laterally thereon. In addition, the aircraft 1 also has control surfaces (tailplane, vertical stabilizer, landing flaps, etc.) which are arranged on the fuselage or the wings, wherein the control surfaces are not marked separately with reference signs and are only mentioned here for the sake of completeness.

Air inlet openings 7 are arranged on the fuselage, typically laterally on the fuselage and below the wings 5. However, it should be understood that the positioning of the air inlet openings is only shown here as an example and is not decisive for the design of the described air inlet device.

The air inlet openings 7 draw in air from the environment and pass it on to, among other things, the engine 10 or engines 10. The air is guided from the air inlet opening 7 via a duct to the engine 10 or its first compressor stage.

In order to keep the radar signature of an aircraft low, various measures are sometimes taken. One of these is to avoid a direct line of sight, from the front, of the engine and its first compressor stage, because the engine or its first compressor stage is a very strong reflector for radar signals. The direct line of sight can be avoided by curving the duct between the air inlet opening and the engine. However, this has the disadvantage that the air has to follow the curvature, which can affect the airflow in a manner detrimental to the engine.

An alternative to curved air inlets or air ducts is the use of an air inlet device located between the air inlet opening and the engine in the air duct. The air inlet device allows the air to flow in a straight line against the engine, whereby the air is not or only hardly swirled.

The air inlet device described here combines several properties: a direct line of sight to the engine can optionally be avoided; the air continues to flow in a straight line towards the engine; the air inlet device can be switched to a state in which it lets the air through in a straight line to the engine. Thus, the air inlet device combines properties that are advantageous for stealth from radar reconnaissance with properties that do not limit engine performance, so that the desired setting of the air inlet device can be selected depending on a mission profile.

Figure 2:
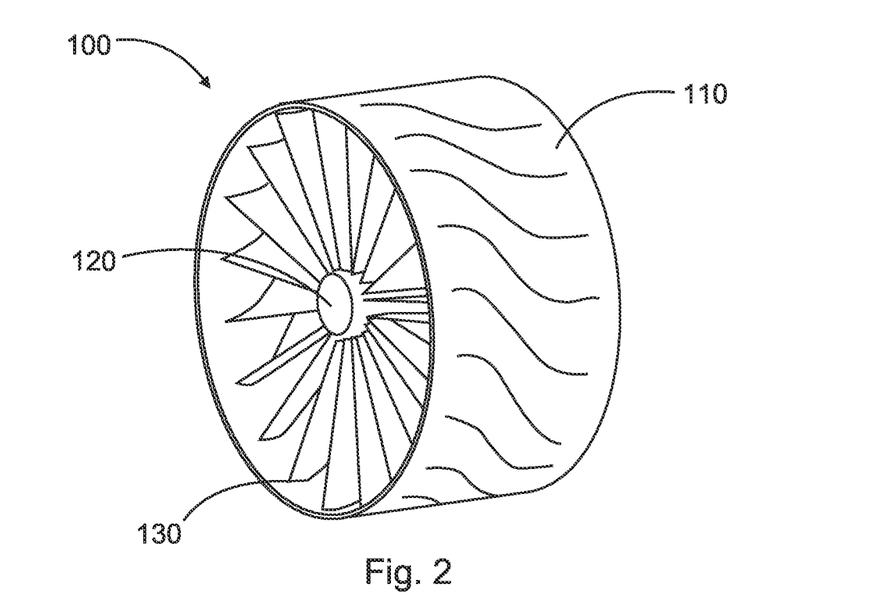
FIG. 2 shows a schematic representation of an air inlet device.

FIG. 2 shows a schematic representation of an air inlet device 100. The air inlet device 100 has a frame 110, a center tube 120, and a plurality of air guide arrangements 130. The air guide arrangements 130 extend radially from the center tube to the frame 130. The air guide arrangements 130 can also be referred to as air baffles. The air guide arrangements 130 are arranged in the circumferential direction around the center tube 120 such that a gap is formed between each of the adjacent air guide arrangements 130, through which gap air can flow from an inlet side to an opposite outlet side.

Figure 3:
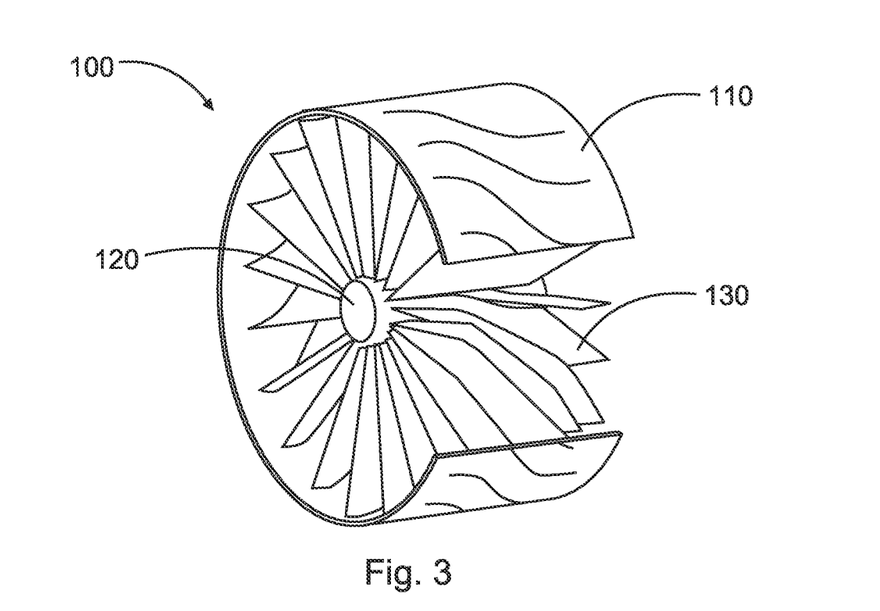
FIG. 3 shows a schematic representation of the air inlet device from FIG. 2 in a sectional view.

FIG. 3 shows the illustration of the air inlet device 100 of FIG. 2 with a detail cut away so as to be able to follow the curved course of the air guide arrangements 130 from the inlet side to the outlet side (from left to right in the representation of FIG. 2 and FIG. 3). The air flows in a straight line against the leading edge of the air guide arrangements 130. Thereafter, the air guide arrangement 130 transitions into a right-hand bend, which transitions to a left-hand bend before the trailing edge of the air guide arrangement again directs air out of the air inlet device 100 along the central axis of the frame. In the curved state of the air guide arrangements 130 shown, there is no direct line of sight from the inlet side to the outlet side because the trailing edge of the air guide arrangement is twisted in the circumferential direction with respect to the leading edge of the air guide arrangement to the extent that any gap between adjacent air guide arrangements is blocked from a direct line of sight by the curved course.

Figure 4:
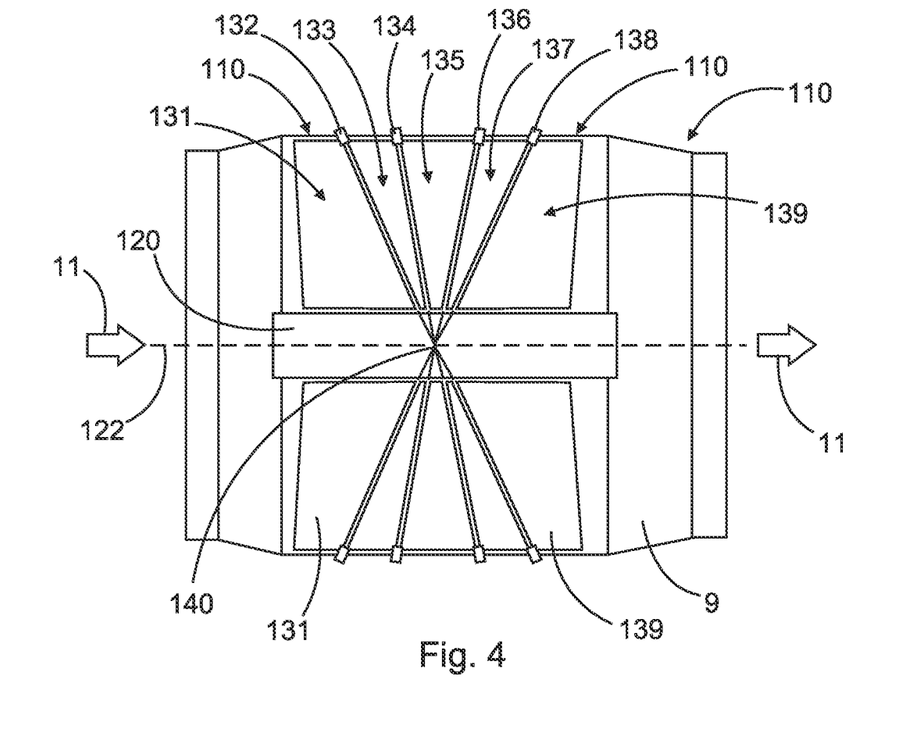
FIG. 4 shows a schematic cross-sectional representation of an air inlet device with the structure of an air guide arrangement.

FIG. 4 shows a cross-sectional view of the air inlet device 100 with an air guide arrangement on both sides of the center tube 120, wherein each air guide arrangement is divided into inlet plate 131, pivot plates 133, and outlet plate 139. In FIG. 4, the airflow direction 11 is drawn from left to right. The air moves towards the inlet side, through the air inlet device 100, and then flows from the outlet side to the engine (not shown). The air inlet device 100 has a central axis 122 which runs substantially parallel to the airflow direction 11 (except for the airflow direction in the curved regions of the air guide arrangements).

In FIG. 4, it can be seen that the cross-section of the air inlet device 100 widens in front of the air guide arrangements (on the left) and reduces or narrows after the air guide arrangements (on the right). Accordingly, the air inlet duct 9 has a cross-sectional widening on the inlet side and a cross-sectional narrowing on the outlet side, so that the frame 110 has a conical region at the corresponding points.

One air guide arrangement can be seen above and one below the center tube 120. The two air guide arrangements are symmetrical to each other with respect to the central axis 122. Each air guide arrangement also has a further axis of symmetry, namely a vertical axis of symmetry in FIG. 4, which runs centrally through the second pivot plate 135. However, it is noted that there can be embodiments that do not have this vertical axis of symmetry.

The structure of an air guide arrangement is now described from left to right (from the inlet side to the outlet side). At the front of the airflow there is first the inlet plate 131. The inlet plate 131 is connected along the first pivot axis 132 to the first pivot plate 133. The first pivot plate 133 is connected to the second pivot plate 135 along the second pivot axis 134. The second pivot plate 135 is connected to the third pivot plate 137 along the third pivot axis 136. The third pivot plate 137 is connected to the outlet plate 139 along the fourth pivot axis 138. All pivot axes allow the connected elements to pivot about the pivot axis with respect to each other to change a relative angular position, as will be described in more detail below.

The inlet plate 131 is immovably connected to the frame 110. A first adjustment ring is connected to the first pivot plate 133 and the second pivot plate 135 in the region of the second pivot axis 134, so that the first and second pivot plates can be rotated in the circumferential direction about the central axis 122 with the aid of the first adjustment ring. When the first adjustment ring is moved, i.e. rotated in the circumferential direction about the central axis 122, the second pivot axis 134 follows this movement and the first pivot plate 133 performs a pivotal movement with respect to the inlet plate 131 and the second pivot plate 135 performs a pivotal movement with respect to the third pivot plate 137.

A second adjustment ring is connected to the second pivot plate 135 and the third pivot plate 137 in the region of the third pivot axis 136, wherein the second adjustment ring moves the second and third pivot plates according to the same mechanism as that by which the first adjustment ring moves the first and second pivot plates. A third adjustment ring is connected to the third pivot plate 137 and the outlet plate 139 in the region of the fourth pivot axis 138. When the third adjustment ring is rotated about the central axis 122, the outlet plate is entrained with this movement while maintaining the orientation of the outlet plate.

The pivot plates 133, 135, 137 are in the form of a regular or irregular trapezoid. The pivot axes 132, 134, 136, 138 run in such a way that they intersect at the common intersection point 140, wherein the common intersection point 140 lies on the central axis 122.

Figure 5:
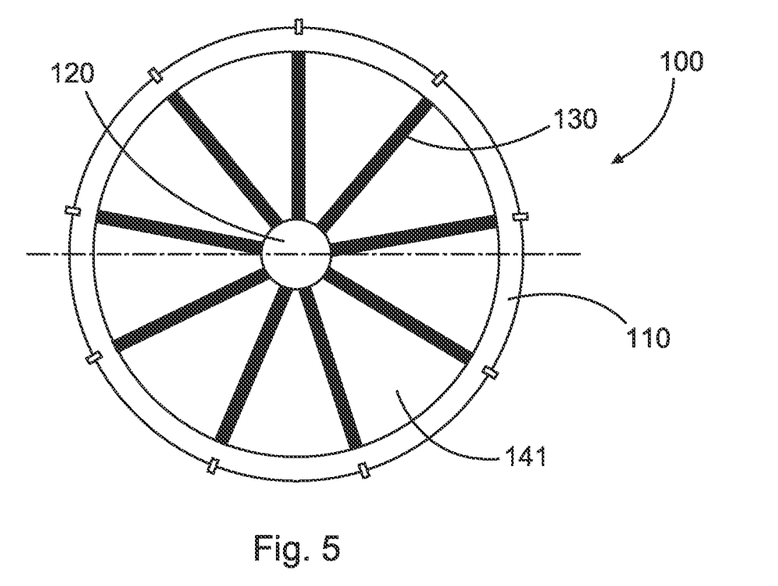
FIG. 5 shows a schematic representation of an adjustment ring of the air inlet device.

FIG. 5 shows a front view of the air inlet device 100. It can be seen that the frame 110 is circular and the center tube 120 is located at the center of the frame. Air guide arrangements 130 extend from the center tube 120 to the frame.

For all embodiments and examples, an aperture angle between adjacent air guide arrangements 130 can be equal so that the gaps are equal and the air guide arrangements 130 are evenly distributed around the center tube.

Figure 6:
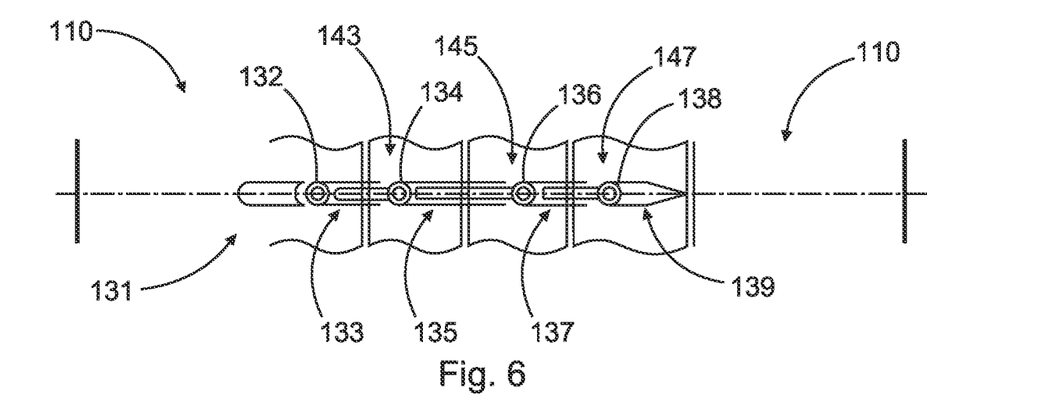
FIG. 6 shows a schematic representation of an air guide arrangement with inlet plate, pivot plates and outlet plate in a linear state.

FIG. 6 shows in detail the connection of an air guide arrangement 130 with the three adjustment rings 143, 145, 147. From left to right, the inlet plate 131 is shown first, which is connected at a first pivot axis 132 to a leading edge of the first pivot plate 133. The trailing edge of the first pivot plate 133 is connected to the leading edge of the second pivot plate 135 at the second pivot axis 134. The trailing edge of the second pivot plate 135 is connected to the leading edge of the third pivot plate 137 at the third pivot axis 136. The trailing edge of the third pivot plate 137 is connected to the leading edge of the outlet plate 139 at the fourth pivot axis 138.

A first adjustment ring 143 is connected to the second pivot axis 134 so that when the first adjustment ring 143 is rotated about the central axis 122, it entrains the second pivot axis 134. A second adjustment ring 145 is connected to the third pivot axis 136 and a third adjustment ring 147 is connected to the fourth pivot axis 138.

Figure 8:
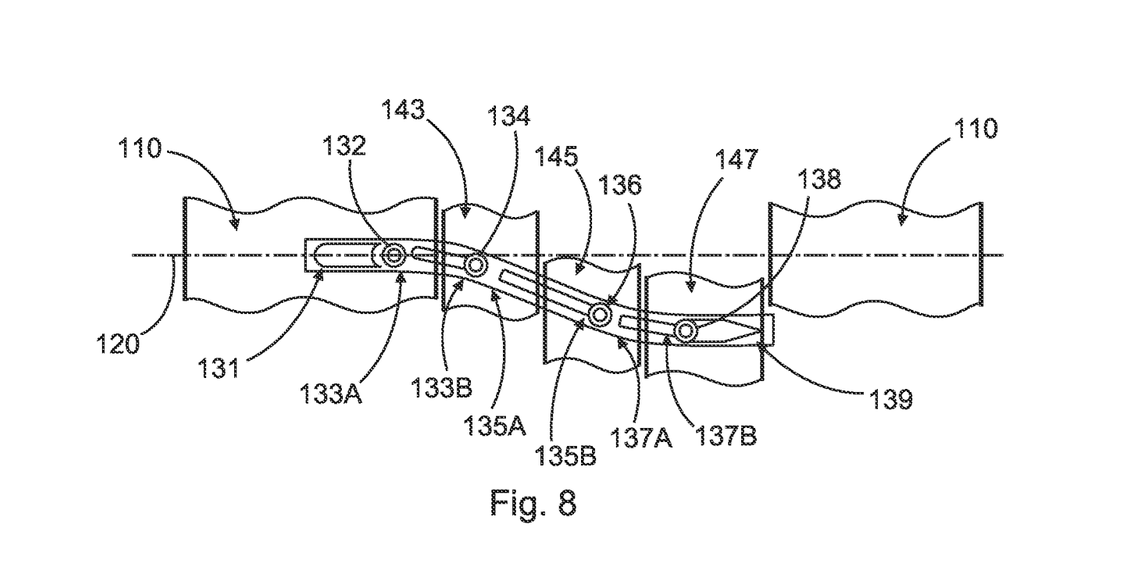
FIG. 8 shows a schematic representation of an air guide arrangement with inlet plate, pivot plates and outlet plate in a curved state.

When the adjustment rings 143, 145, 147 are rotated, the pivot plates and the outlet plate are changed from the state shown in FIG. 6 to a curved state. The curved state is shown in FIG. 8. However, before discussing the curved state in FIG. 8, the structure of a pivot plate is presented.

Figure 7:
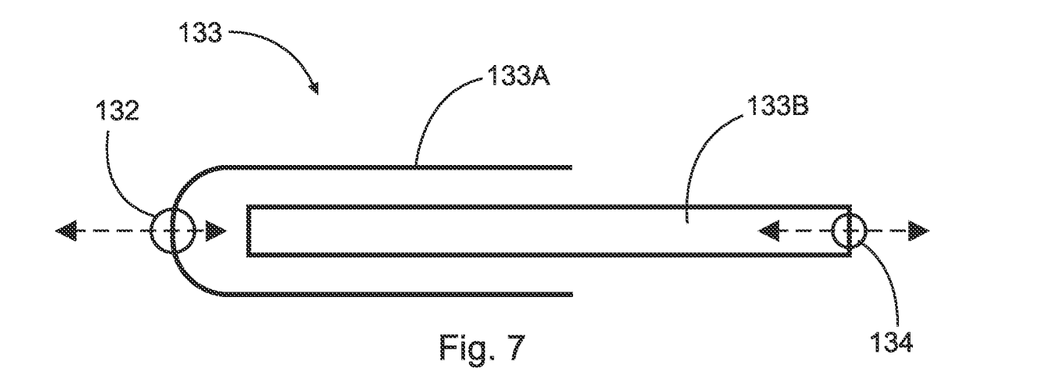
FIG. 7 shows a schematic representation of a pivot plate.

FIG. 7 shows the basic structure of a pivot plate, here using the example of the first pivot plate 133. The first pivot plate consists of or comprises a first portion 133A and a second portion 133B. The first portion 133A is connected to the first pivot axis 132, the second portion 133B is connected to the second pivot axis 134. The first portion 133A has a U-shaped profile into which the second portion 133B can be inserted or withdrawn. In both the retracted and extended states, the pivot plate (and also the other pivot plates) has a continuous surface capable of directing and guiding an airflow to the engine. The structure of the pivot plates allows the first portion 133A and the second portion 133B to be moved relative to each other individually or simultaneously, as shown by the arrows on the pivot axes 132, 134.

When the air guide arrangement 130 is moved from the linear state to the curved state (or vice versa), this is accompanied by a change in the length of the pivot plates. The structure shown in FIG. 7 enables this change in length.

FIG. 8 shows the air guide arrangement 130 in a curved state. Referring to FIG. 6, the first adjustment ring 143 has been rotated by a first angular amount in the circumferential direction about the central axis 122. In doing so, the first pivot plate 133 has increased in length and the second element 133B has been withdrawn from the first element 133A. The first pivot plate 133 has performed a pivotal movement with respect to the inlet plate 131 about the first pivot axis 132. The second adjustment ring 145 has been rotated about the central axis by a second angular amount greater than the first angular amount, and the second element 135B of the second pivot plate 135 and the first element 137A of the third pivot plate 137, which are connected to each other at the third pivot axis 136, have been entrained. The third adjustment ring 147 has been rotated by a third angular amount larger than the second angular amount about the central axis, and the second element 137B of the third pivot plate 137 and the outlet plate 139, which are connected to each other at the third pivot axis 138, have been entrained.

In order to achieve a uniform doubly curved course of the air guide arrangement, the first angular amount can correspond to the difference between the second angular amount and the third angular amount.

Figure 9:
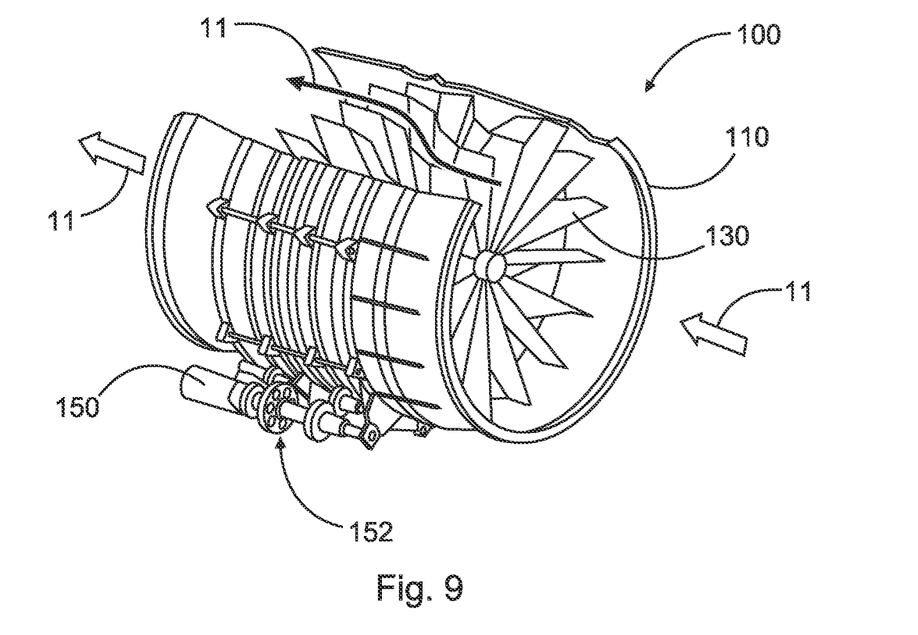
FIG. 9 shows a schematic representation of the air inlet device with the air arrangements in a curved state.
Figure 10:
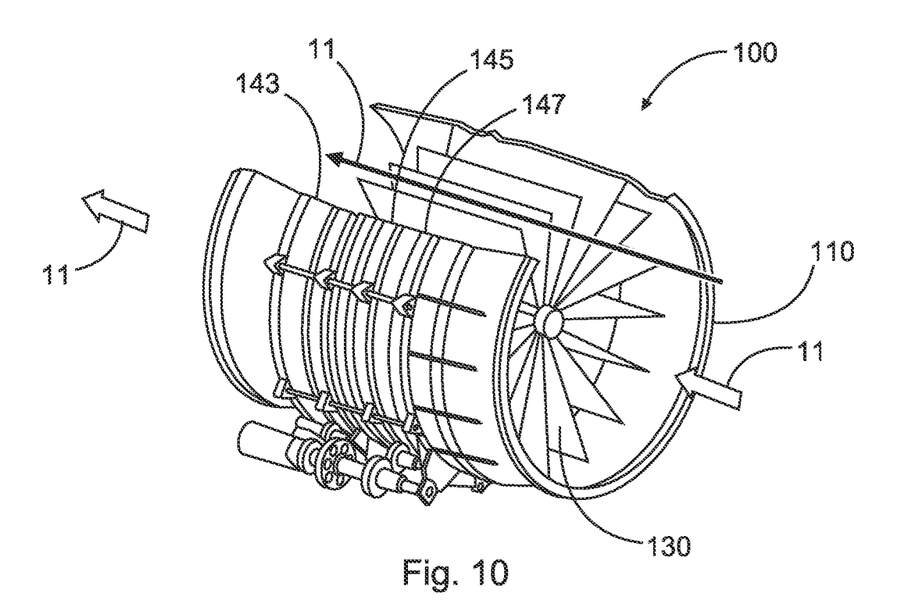
FIG. 10 shows a schematic representation of the air inlet device with the air arrangements in a linear state.

FIG. 9 and FIG. 10 show an air inlet device 100 with the air guide arrangements 130 in the curved state (FIG. 9) and in the linear state (FIG. 10). In these representations, an actuator 150 is shown in the form of an electric motor coupled to a gearing 152 and gear wheels with the adjustment rings 143, 145, 147. The drive shaft of the actuator is coupled to the adjustment rings with different transmission ratios, so that the same input movement of the actuator 152 causes rotations of the adjustment rings about the central axis of different angular amounts. In other words, the same movement of the drive shaft causes the third adjustment ring 147 to rotate further than the second adjustment ring 145, and the second adjustment ring 145 to rotate further than the first adjustment ring 143, to achieve the state of the air guide arrangements 130 shown in FIG. 8.

FIG. 10 shows that an airflow flows in a straight line in the airflow direction 11 between the air guide arrangements 130. In contrast, FIG. 9 shows the curved course of the airflow 11 when the air guide arrangements 130 are in the curved state.

The adjustment rings can be constructed similarly to a wheel with hub and spokes. The outer ring of the adjustment ring forms the surface of the frame, as shown in FIGS. 9 and 10. Several spokes extend from the outer ring to an inner ring. The inner ring can be designed as a sliding bushing that is supported on the center tube and can rotate on the center tube. The spokes of the adjustment rings serve to fasten the pivot plates and the outlet plate as shown in FIGS. 6 and 8. When an adjustment ring is rotated about the central axis, the fastening of the pivot plates or the outlet plate to the spokes of the adjustment ring allows the pivot plates to perform the pivotal movement about the pivot axes necessary to move the air guide arrangement 130 from the linear state to the curved state (or vice versa).

It should be noted that "comprising" or "having" does not exclude any other elements or steps, or a greater number of elements and steps than explicitly stated, than are recited in the claims and/or the description. "One" or "a" does not exclude a plurality. Features or steps that have been described with reference to any of the above example embodiments can also be used in combination with other features or steps of other example embodiments described above. Reference signs in the claims are not to be regarded as a limitation.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise.

LIST OF REFERENCE SIGNS

1 Aircraft
3 Fuselage
5 Wings, control surfaces
7 Air inlet opening
9 Air inlet duct
10 Engine
11 Airflow direction
100 Air inlet device
110 Frame
120 Middle tube
122 Central axis
130 Air guide arrangement
131 Inlet plate
132 First pivot axis
133 First pivot plate
133A First portion
133B Second portion
134 Second pivot axis
135 Second pivot plate
136 Third pivot axis
137 Third pivot plate
138 Fourth pivot axis
139 Outlet plate
140 Intersection point
141 Gap
143 First adjustment ring
145 Second adjustment ring
147 Third adjustment ring
150 Actuator
152 Drive, gearing

The invention claimed is:

1. An air inlet device for an air inlet duct to an engine of an aircraft, the air inlet device comprising:
a frame;
a center tube, which extends in an airflow direction;
a plurality of air guide arrangements, which extend between the frame and the center tube;
wherein an air guide arrangement of the plurality of air guide arrangements has an inlet plate, a first pivot plate, a second pivot plate, a third pivot plate and an outlet plate;
wherein the inlet plate and the first pivot plate are pivotably connected to each other via a first pivot axis;
wherein the first pivot plate and the second pivot plate are pivotably connected to each other via a second pivot axis;
wherein the second pivot plate and the third pivot plate are pivotably connected to each other via a third pivot axis;
wherein the third pivot plate and the outlet plate are pivotably connected to each other via a fourth pivot axis; and
wherein the first pivot axis, the second pivot axis, the third pivot axis and the fourth pivot axis extend such that they intersect at a common intersection point located on a central axis of the air inlet device.

2. The air inlet device according to claim 1, wherein the frame and the center tube have a circular cross-section.

3. The air inlet device according to claim 1, wherein the first pivot plate, the second pivot plate and the third pivot plate have a variable extension in the airflow direction.

4. The air inlet device according to claim 1, further comprising a plurality of adjustment rings;
wherein a first adjustment ring of the plurality of adjustment rings is connected to the first pivot plate and the second pivot plate at the second pivot axis;
wherein a second adjustment ring of the plurality of adjustment rings is connected to the second pivot plate and the third pivot plate at the third pivot axis; and
wherein a third adjustment ring of the plurality of adjustment rings is connected to the third pivot plate and the outlet plate at the fourth pivot axis.

5. The air inlet device according to claim 4, wherein each adjustment ring is connected to the connected pivot plates such that the pivot plates perform a rotational or pivotal movement relative to the adjustment ring when the adjustment ring is rotated about the central axis of the air inlet device.

6. The air inlet device according to claim 4, wherein the plurality of adjustment rings form a portion of the frame and the adjustment rings of the plurality of adjustment rings are arranged one behind another in the airflow direction.

7. The air inlet device according to claim 4, further comprising an actuator connected to each adjustment ring of the plurality of adjustment rings such that a movement of the actuator is transmitted to the adjustment rings to rotate the adjustment rings about the central axis of the air inlet device.

8. The air inlet device according to claim 7, wherein the actuator is connected to each adjustment ring via a gearing; and
wherein the actuator is connected to each adjustment ring via a different gear ratio.

9. The air inlet device according to claim 4, wherein the inlet plate and the outlet plate are always oriented in the airflow direction regardless of a rotational position of the adjustment rings.

10. The air inlet device according to claim 1, wherein the frame has a cross-sectional widening in front of the plurality of air guide arrangements in the airflow direction; and
wherein the frame has a cross-sectional constriction after the plurality of air guide arrangements in the airflow direction.

* * * * *